United States Patent
High et al.

(10) Patent No.: US 10,399,775 B2
(45) Date of Patent: Sep. 3, 2019

(54) AUTONOMOUS LOCKER DELIVERY

(71) Applicant: Walmart Apollo, LLC, Bentonville, AR (US)

(72) Inventors: Donald R. High, Noel, MO (US); David C. Winkle, Bella Vista, AR (US); Michael D. Atchley, Eureka Springs, AR (US); Brian G. McHale, Chadderton Oldham (GB); Nicholas Ray Antel, Winona, MO (US); John J. O'Brien, Farmington, AR (US); Todd D. Mattingly, Bentonville, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/265,876

(22) Filed: Feb. 1, 2019

(65) Prior Publication Data
US 2019/0168966 A1 Jun. 6, 2019

Related U.S. Application Data
(63) Continuation of application No. 15/851,268, filed on Dec. 21, 2017, now Pat. No. 10,227,178.
(Continued)

(51) Int. Cl.
*G06F 7/00* (2006.01)
*B65G 1/137* (2006.01)
(Continued)

(52) U.S. Cl.
CPC ............ *B65G 1/137* (2013.01); *B60P 1/6481* (2013.01); *B60P 3/06* (2013.01); *B60P 3/20* (2013.01); *G06Q 10/0832* (2013.01)

(58) Field of Classification Search
None
See application file for complete search history.

(56) References Cited

U.S. PATENT DOCUMENTS

| 9,211,025 B1 | 12/2015 | Elhawwashy |
| 9,234,757 B2 | 1/2016 | Skaaksrud |

(Continued)

FOREIGN PATENT DOCUMENTS

| WO | 2010129798 | 11/2010 |
| WO | 2016012741 | 1/2016 |

OTHER PUBLICATIONS

Domino'S; "DRU—Domino's Robotic Unit"; https://www.dominos.co.nz/insidedominos/technology/dru; pp. 1-4.
(Continued)

*Primary Examiner* — Yolanda R Cumbess
(74) *Attorney, Agent, or Firm* — Fitch, Even, Tabin & Flannery LLP

(57) ABSTRACT

Generally speaking, pursuant to various embodiments, systems, apparatuses, and methods are provided herein useful for autonomously delivering lockers. In some embodiments, a system comprises a carrier vehicle, the carrier vehicle comprising a storage area, a docking station including a plurality of storage docks, each of the plurality of storage docks configured to secure at least one locker, wherein the docking station is located within the storage area, and a retrieval point, a plurality of lockers each configured to house at least one product, a delivery vehicle, the delivery vehicle comprising a delivery dock, wherein the delivery dock is configured to receive, at the retrieval point, at least one locker, and a propulsion mechanism, wherein the propulsion mechanism propels the delivery vehicle, and a control circuit, the control circuit configured to identify,
(Continued)

from the plurality of lockers, a selected locker, and cause the selected locker to move to the retrieval point.

18 Claims, 3 Drawing Sheets

Related U.S. Application Data

(60) Provisional application No. 62/437,136, filed on Dec. 21, 2016.

(51) Int. Cl.
*B60P 3/06* (2006.01)
*G06Q 10/08* (2012.01)
*B60P 1/64* (2006.01)
*B60P 3/20* (2006.01)

(56) References Cited

U.S. PATENT DOCUMENTS

| | | | |
|---|---|---|---|
| 9,244,147 B1 | 1/2016 | Soundararajan | |
| 9,256,852 B1 | 2/2016 | Myllymaki | |
| 9,550,577 B1 | 1/2017 | Beckman | |
| 9,573,684 B2 | 2/2017 | Kimchi | |
| 2012/0118699 A1 | 5/2012 | Buchmann et al. | |
| 2014/0032034 A1 | 1/2014 | Raptopoulos | |
| 2014/0136414 A1 | 5/2014 | Abhyanker | |
| 2015/0277440 A1 | 10/2015 | Kimchi | |
| 2015/0307276 A1* | 10/2015 | Hognaland | B65G 1/0464 |
| | | | 700/218 |
| 2016/0196755 A1 | 7/2016 | Navot | |
| 2016/0257401 A1 | 9/2016 | Buchmueller | |
| 2016/0368464 A1* | 12/2016 | Hassounah | B60S 5/06 |
| 2017/0110017 A1 | 4/2017 | Kimchi | |
| 2017/0225601 A1* | 8/2017 | Borders | B60P 1/6418 |
| 2018/0190054 A1* | 7/2018 | Perez | G07C 9/00309 |

OTHER PUBLICATIONS

Murray, Chase; "The Flying Sidekick Traveling Salesman Problem: Optimization of Drone-assisted Parcel Delivery"; UAVs and Operations Research; http://www.chasemurray.com/ research/1802/; published 2015; pp. 1-8.

PCT; App. No. PCT/US2017/067023; International Search Report and Written Opinion dated Feb. 13, 2018.

USPTO; U.S. Appl. No. 15/851,268; Notice of Allowance dated Nov. 1, 2018.

USPTO: U.S. Appl. No. 15/851,268; Office Action dated Jul. 19, 2018.

Workhorse Group; "HorseFly by Workhorse—Drone Delivery Concept"; https://www.youtube.com/watch?v=epgZ-luhzKQ; published on Oct. 13, 2015; pp. 1-7.

* cited by examiner

AUTONOMOUS LOCKER DELIVERY

CROSS-REFERENCE TO RELATED APPLICATION

This application is a continuation application of U.S. application Ser. No. 15/851,268, filed Dec. 21, 2017, which claims the benefit of U.S. Provisional Application No. 62/437,136, filed Dec. 21, 2016, which are all incorporated by their reference in their entirety herein.

TECHNICAL FIELD

This invention relates generally to autonomous vehicles and, more specifically, to autonomous delivery vehicles.

BACKGROUND

When customers shop for products remotely, the products purchased by the customers are typically delivered to the customers. Delivering products to customers can result in significant costs for retailers. Similarly, manufacturers incur significant costs delivering products to retailers. These costs are passed on to customers in the form of higher prices. Consequently, decreases in delivery costs can translate directly into lower prices for customers. Accordingly, a need exists to decrease costs associated with delivery products.

BRIEF DESCRIPTION OF THE DRAWINGS

Disclosed herein are embodiments of systems, apparatuses, and methods pertaining to autonomously delivering lockers. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful for autonomously delivering lockers. In some embodiments, a system comprises a carrier vehicle, the carrier vehicle comprising a storage area, a docking station, wherein the docking station includes a plurality of storage docks, each of the plurality of storage docks configured to secure at least one locker, wherein the docking station is located within the storage area, and a retrieval point, a plurality of lockers, each of the plurality of lockers configured to house at least one product, a delivery vehicle, the delivery vehicle comprising a delivery dock, wherein the delivery dock is configured to receive, at the retrieval point, at least one locker, and a propulsion mechanism, wherein the propulsion mechanism propels the delivery vehicle, and a control circuit, the control circuit configured to identify, from the plurality of lockers, a selected locker, and cause the selected locker to move to the retrieval point.

Figure 1:
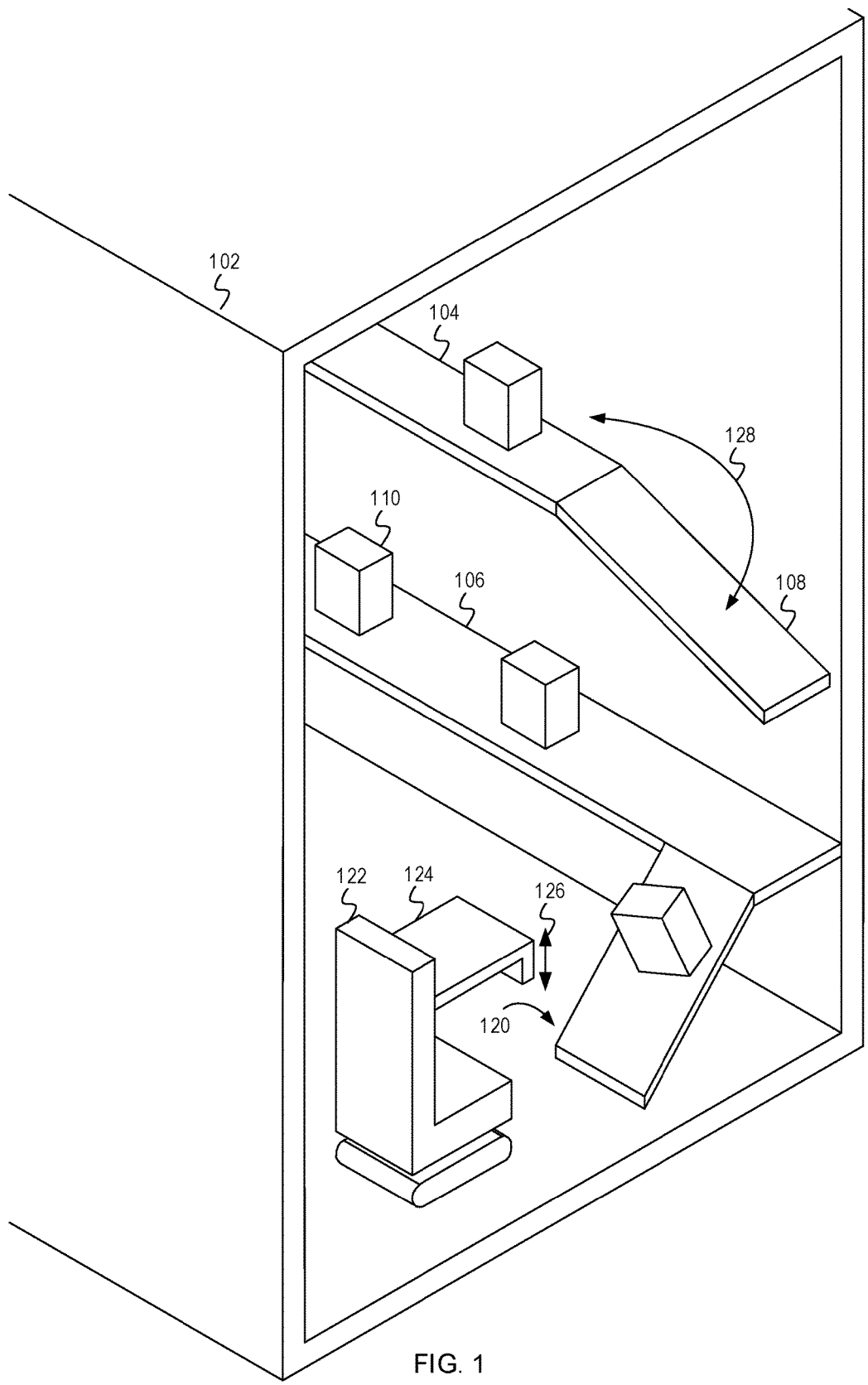
FIG. 1 depicts a carrier vehicle 102 and a delivery vehicle 122 autonomously delivering lockers 110, according to some embodiments.

As previously discussed, retailers and manufacturers incur significant costs delivering products. Just like equipment, such as vehicles and storage containers, human labor contributes to delivery costs. For example, human labor is currently needed to pilot vehicles carrying the products and remove the products from the vehicles. Disclosed herein are systems, methods, and apparatuses that can reduce delivery costs by autonomously delivering products. In some embodiments, carrier vehicles (e.g., trucks, trailers, trains, boats, etc.) transports lockers, which contain products, to a delivery location (e.g., a customer's home, a warehouse, etc.). The carrier vehicle also transports at least one delivery vehicle. The delivery vehicle receives the lockers and transports the lockers from the carrier vehicle to the delivery location (e.g., on a customer's porch, on a shelf in a warehouse, etc.). The carrier vehicle and the delivery vehicle operate autonomously. FIG. 1 depicts one example of such a system.

FIG. 1 depicts a carrier vehicle 102 and a delivery vehicle 122 autonomously delivering lockers 110, according to some embodiments. Although the carrier vehicle depicted in FIG. 1 is a box truck, only the rear of which is visible, the carrier vehicle 102 can be any suitable type of vehicle (land-based, aquatic, or aerial). The cargo portion (i.e., a storage area) of the carrier vehicle 102 includes shelves (i.e., a first shelf 106 and a second shelf 104). The shelves hold the lockers 110. The lockers 110 house (i.e., contain or hold) products. For example, each of the lockers 110 can house products associated with orders placed by different customers. If the lockers 110 are to be delivered to retail establishment or warehouses, the lockers 110 can house products for the retail establishments or warehouses. The shelves can act as a docking station and releasably secure the lockers 110. For example, the shelves can include securement devices that affix the lockers 110 to the shelf. The second shelf 104 includes a movable portion 108 which pivots, as indicated by arrow 128. When extended downwards, the movable portion 108 allows lockers 110 on the second shelf to move to the first shelf 106. In some embodiments, the shelves include a movement mechanism, such as a conveyor belt, along which the lockers 110 move. For example, the securement devices can be affixed to the conveyor belt and carry the lockers 110 across the shelves.

As the lockers 110 move along the shelves, they proceed to a retrieval point 120. The delivery vehicle 122 receives the lockers 110 at the retrieval point. The delivery vehicle 122 includes a delivery dock designed to receive the locker 110. The delivery dock can be similar to the securement device in that it can secure a locker 110. As depicted in the example system of FIG. 1, the delivery dock includes a movable arm 124. The delivery vehicle 122 can reposition to movable arm 124, as indicated by arrow 126, to secure the lockers 110. In some embodiments, the delivery vehicle 122 verifies that the correct locker 110 was received. For example, the delivery vehicle can read a visible, auditory, or transmittable (e.g., nearfield communication) code from the locker 110 to verify that the correct locker is received. In such embodiments, the delivery vehicle 122 can also transmit a verification message to the carrier vehicle 102, the locker 110, and/or the customer indicating that the correct locker 110 was received. The delivery vehicle 122 also includes a propulsion mechanism so that the delivery vehicle 122 can autonomously deliver the lockers 110. For example, the propulsion mechanism can include an engine or motor, a transmission (if necessary), and wheels, tracks or any other device that allows the delivery vehicle 122 to move. Although the example system depicted in FIG. 1 includes a land-based delivery vehicle 122, other possibilities exist (e.g., aquatic, aerial, or any combination of the three, delivery vehicles 122). Additionally, although FIG. 1 depicts only one delivery vehicle 122, in some embodiments the carrier vehicle 102 can transport multiple delivery vehicles 122 to deliver lockers 110.

After receiving the locker 110 at the retrieval point 120, the delivery vehicle 122 delivers the locker 110. The delivery vehicle 122 can exit the carrier vehicle 102 in any suitable manner dependent on the capabilities of the delivery vehicle 122 and the features of the carrier vehicle 102. For example, land-based delivery vehicles 122 can exit the carrier vehicle 102 via a ramp or platform that moves vertically, aerial delivery vehicles 122 can exit the carrier vehicle 102 while airborne, etc. If the locker 110 is intended for delivery to a customer's home, the delivery vehicle 122 delivers the locker 110 to an appropriate location at the customer's home (e.g., a porch, a garage, etc.). If the locker 110 is intended for delivery to a warehouse or retail establishment, the delivery vehicle 122 can deliver the locker 110 to an appropriate location at the warehouse of retail establishment (e.g., a stockroom or sales floor).

Although FIG. 1 depicts a system in which the lockers 110 are located on shelves and ride along conveyer belts, other mechanisms can be used to move and rearrange the lockers 110 within the carrier vehicle 102. As one example, a carousel system, a system similar to that typically found in vending machines, or any other suitable system can be used.

Additionally, in some embodiments, the cargo or storage area can have multiple areas. Each of the multiple areas can be configured to house different types of lockers 110 or lockers 110 that house different types of products. For example, a first area can be a climate controlled area for cold (or hot) products or lockers 110 and a second area can be a non-climate controlled area. In some embodiments, the areas can be configured or designed for lockers 110 or products that require conditions other than climate. For example, one of the areas can include enhanced security, motion or vibration suppression, etc.

Figure 2:
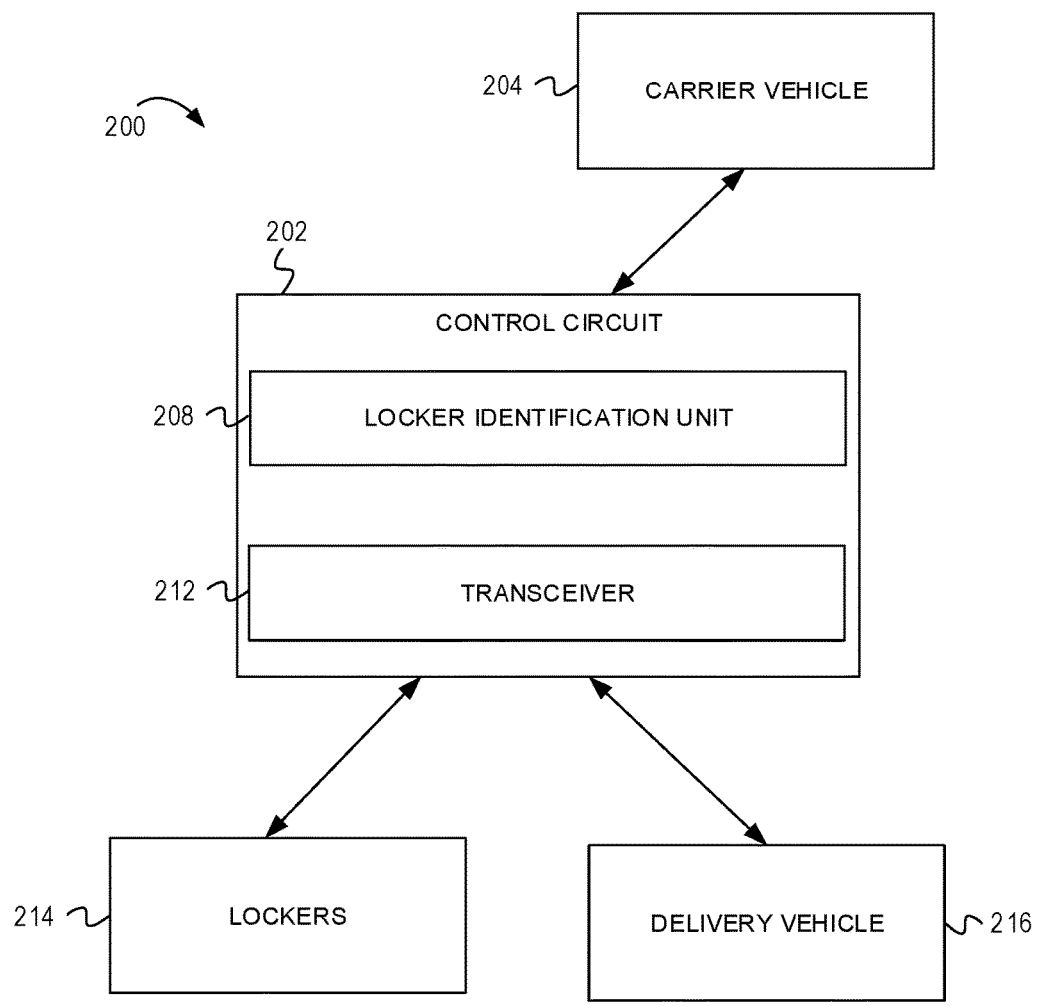
FIG. 2 is a block diagram of a system 200 for autonomously delivering lockers 214, according to some embodiments.

While the discussion of FIG. 1 provides background information regarding a system for autonomously delivering lockers, the discussion of FIG. 2 provides additional information about such a system.

FIG. 2 is a block diagram of a system 200 for autonomously delivering lockers 214, according to some embodiments. The system 200 includes a control circuit 202, a carrier vehicle 204, lockers 214, and a delivery vehicle 216. The lockers 214 house products. The lockers 214 can be as simple as boxes, or much more complex. For example, in some embodiments, the lockers 214 can be climate controlled, include security features such as an authentication device which allows only authorized persons to access the locker 214, positioning devices (e.g., GPS transceivers), power sources, etc. The lockers can house products for delivery to end users (i.e., customers) or retail establishments or warehouses.

The carrier vehicle 204 is an autonomous vehicle that transports the lockers 214 to a delivery location. The carrier vehicle 204 can include docking stations that secure the lockers 214 within a storage area of the carrier vehicle 204. In some embodiments, the docking stations can also provide power to the lockers 214. Additionally, the carrier vehicle 204 includes a retrieval point, form which the delivery vehicle 216 can receive the lockers 214. The carrier vehicle can also include a mechanism that is capable of moving the lockers 214 within the carrier vehicle 204. For example, the mechanism can be a carousel system, a pulley system, a conveyor system, or any other suitable system. The mechanism can move the lockers 214 around within the carrier vehicle 204 to reorder the lockers 214 for delivery. In this respect, the delivery vehicle 216 can easily receive whichever of the lockers 214 is to be delivered next at the retrieval point. Such movement and reordering is beneficial to adjust for delivery changes, route changes, exception handling, etc. The control circuit 202, as will be discussed later, is capable of identifying which of the lockers 214 should be moved to the retrieval point next.

The delivery vehicle 216 is an autonomous vehicle that receives the lockers 214 at the retrieval point. The delivery vehicle 216 includes a delivery dock. The delivery dock is configured to receive, and in some embodiments, secure the lockers 214. Additionally, in some embodiments, the delivery dock can provide power to the lockers 214. After receiving one or more of the lockers 214, the delivery vehicle 216 delivers the one or more lockers 214 from the carrier vehicle 204 to the delivery location (e.g., near a customer's door, in or near a customer's garage, at a warehouse, on a shelf at a warehouse or on a sales floor, etc.). In some embodiments, the carrier vehicle 204 can transport multiple delivery vehicles 216. In such embodiments, the carrier vehicle 204 can stop at a central location and the multiple delivery vehicles 216 can deliver the lockers 214 from the central location. For example, the carrier vehicle 204 can proceed to the entrance of a neighborhood or a specific street, and the multiple delivery vehicles 216 can work in concert to deliver lockers to all necessary locations within the vicinity of the entrance to the neighborhood or the specific street.

The control circuit 202 can perform many functions, such as identifying one or more of the lockers 214 and causing the one or more of the lockers 214 to be moved to the retrieval point. The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 302, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 includes a locker identification unit 208. The locker identification unit 208 identifies lockers 214. For example, the locker identification unit 208 can identify the next of the lockers 214 to be delivered. After identifying one or more of the lockers 214 as selected lockers 214, the control circuit 202 causes the selected lockers 214 to move to the retrieval point. For example, the control circuit 202 can cause a mechanism such as a carousel, conveyor belt, and/or a pneumatic pump to move the selected lockers 214 such that the selected lockers 214 move to the retrieval point.

In some embodiments, the control circuit 202 includes a transceiver 212. The transceiver 212 can transmit information to, and receive information from, the lockers 214, the delivery vehicle 216, and/or the carrier vehicle 204. For example, the transceiver 212 can receive indications of products housed within the lockers 214 from the lockers 214, status information from the delivery vehicle 216, and delivery schedules and changes from the carrier vehicle 204. Additionally, the transceiver 212 can transmit an indication to the customer that selected lockers 214 have been delivered. The transceiver 212 transmits the indication that the selected lockers 214 have been delivered after determining that a trigger condition has occurred. The trigger condition, for example, can be removal of the selected lockers 214 from the retrieval point, delivery of the selected lockers 214 by the delivery vehicle, and the identification of the selected lockers 214 by the control circuit 202.

The control circuit 202 can be located on the carrier vehicle 204, or can be remote from the carrier vehicle 204. If the control circuit 202 is remote from the carrier vehicle 204, the control circuit may be responsible for identifying lockers transported by multiple carrier vehicles 204.

Figure 3:
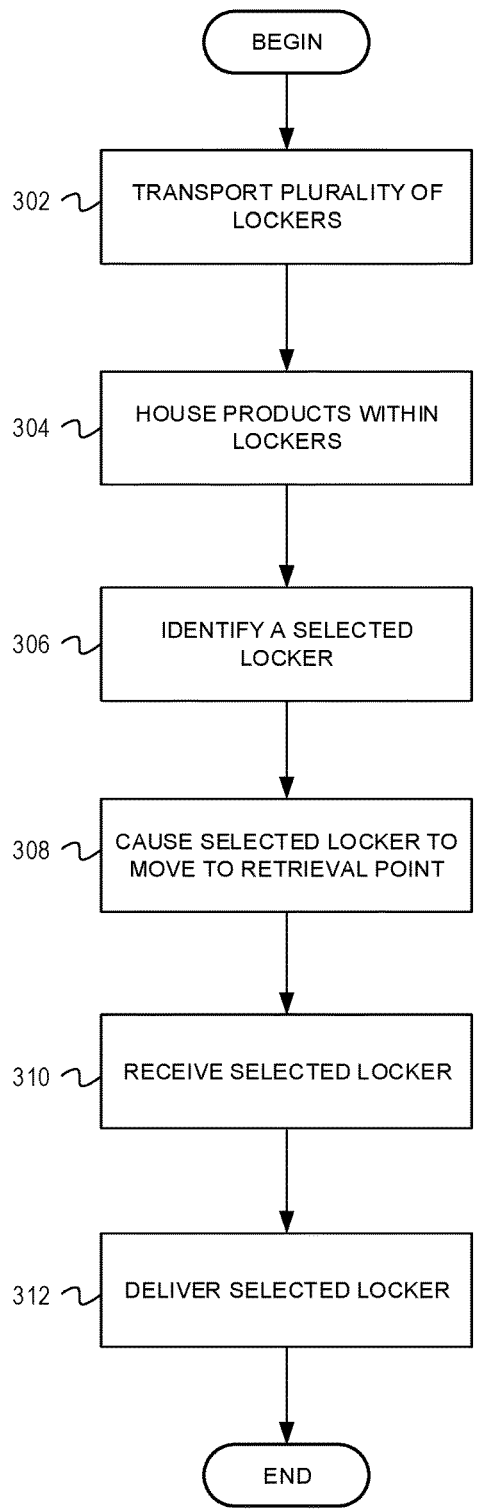
FIG. 3 is a flow chart depicting example operations for autonomously delivering lockers, according to some embodiments.

While the discussion of FIG. 2 provides additional detail with regard to a system for autonomously delivering lockers, the discussion of FIG. 3 describes example operations for autonomously delivering lockers.

FIG. 3 is a flow chart depicting example operations for autonomously delivering lockers, according to some embodiments. The flow begins at block 302.

At block 302, a plurality of lockers are transported. For example, a carrier vehicle can transport the plurality of lockers to a delivery location. The carrier vehicle is an autonomous vehicle that includes docking stations. The docking stations secure the plurality of lockers within a storage area of the carrier vehicle. The storage area can include multiple areas, such as climate controlled areas, secure areas, etc. The plurality of lockers can move within the storage area. For example, each of the plurality of lockers can be moved so that delivery order can be changed. The delivery location can be a location at which one or more of the plurality of lockers is to be delivered or a central location from which one or more of the plurality of lockers will be dispatched for delivery. The flow continues at block 304.

At block 304, products are housed within the lockers. The lockers are configured to house products. In some embodiments, the lockers include a power supply. In such embodiments, the power supply can provide power to a climate control unit, an authentication device, etc. In some embodiments, the lockers are owned by individuals (e.g., individuals to which the lockers are to be delivered) or groups (e.g., a homeowners association). In other embodiments, the lockers are owned by the entity responsible for delivering the lockers. For example, some of the lockers may be owned by a retailer and some of the lockers may be owned by customers. In such embodiments, the lockers can be part of exchange program in which when lockers are delivered, previously delivered lockers are picked up and returned. Additionally, in some embodiments, the system can perform steps similar to those described herein in a different order, such as backwards, to retrieve the lockers. For example, the delivery vehicle (or carrier vehicle) can identify lockers possessed by a customer, retrieve the lockers from a customer location or retrieval or pickup point, transport the lockers back to the retrieval point on the carrier vehicle, and the carrier vehicle can reshelf the lockers. The flow continues at block 306.

At block 306, a selected locker is identified. For example, a control circuit can identify the selected locker. The control circuit identifies the selected locker as the next of the lockers to be delivered. In some embodiments, the control circuit receives a delivery schedule or route and identifies the selected locker based on the delivery schedule or route. In other embodiments, the control circuit evaluates current conditions and any changes (e.g., exception handling, rerouting, etc.) and identifies a selected locker dynamically. In either case, block chain or similar technologies can be used to track and record which lockers are to be delivered. The flow continues at block 308.

At block 308, the selected locker is caused to be moved to a retrieval point. For example, the control circuit can cause the selected locker to be moved to the retrieval point. The selected locker is moved to the retrieval point so that a delivery vehicle can receive the selected locker. The control circuit can cause the selected locker to move to the retrieval point via a conveyor mechanism, a carousel mechanism, or any other suitable mechanism. The flow continues at block 310.

At block 310, the selected locker is received. For example, the delivery vehicle can receive the selected locker. The delivery vehicle includes a delivery dock configured to receive the selected locker. The delivery vehicle also includes a propulsion mechanism that enables the delivery vehicle to autonomously deliver the selected locker. In some embodiments, block chain or similar technologies can be used to authenticate the locker and/or ensure that the correct locker is received by the delivery vehicle. The flow continues at block 312.

At block 312, the selected locker is delivered. For example, the delivery vehicle can deliver the selected locker. The delivery vehicle can deliver the selected locker to a customer's home, a retail establishment, a warehouse, etc.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

Generally speaking, pursuant to various embodiments, systems, apparatuses, and methods are provided herein useful for autonomously delivering lockers. In some embodiments, a system comprises a carrier vehicle, the carrier vehicle comprising a storage area, a docking station, wherein the docking station includes a plurality of storage docks, each of the plurality of storage docks configured to secure at least one locker, wherein the docking station is located within the storage area, and a retrieval point, a plurality of lockers, each of the plurality of lockers configured to house at least one product, a delivery vehicle, the delivery vehicle comprising a delivery dock, wherein the delivery dock is configured to receive, at the retrieval point, at least one locker, and a propulsion mechanism, wherein the propulsion mechanism propels the delivery vehicle, and a control circuit, the control circuit configured to identify, from the plurality of lockers, a selected locker, and cause the selected locker to move to the retrieval point.

In some embodiments, an apparatus and a corresponding method performed by the apparatus, comprises transporting, via a docking station within a storage area of a carrier vehicle, a plurality of lockers, wherein the delivery area includes a retrieval point, housing, within each of the plurality of lockers, at least one product, identifying, from the plurality of lockers, a selected locker, causing the selected locker to move from the docking station to the retrieval point, receiving, via a delivery vehicle at the retrieval point, the selected locker, and delivering, via the delivery vehicle, the selected locker.

What is claimed is:

1. A system for autonomously delivering lockers, the system comprising:
    a carrier vehicle, the carrier vehicle comprising:
        a storage area configured to house a plurality of lockers;
        a docking station, wherein the docking station includes a plurality of storage docks, each of the plurality of storage docks configured to releasably secure at least one locker, and wherein the docking station is located within the storage area; and
        a retrieval point;
    the plurality of lockers, each of the plurality of lockers configured to house at least one product;
    a control circuit located on the carrier vehicle, the control circuit configured to:
        identify, from the plurality of lockers, a selected locker; and
        cause the selected locker to move to the retrieval point.

2. The system of claim 1, wherein the delivery vehicle travels via one or more of land, water, and air.

3. The system of claim 1, wherein at least some of the plurality of lockers include a climate control unit, wherein the climate control units are configured to maintain a climate-controlled environment inside each of the at least some of the plurality of lockers.

4. The system of claim 1, wherein the storage area includes a first area and a second area, and wherein the first area is climate controlled.

5. The system of claim 1, wherein the control circuit is further configured to:
    determine, based on a trigger condition, that the selected locker has been delivered.

6. The system of claim 5, wherein the control circuit is further configured to:
    in response to the determination that the selected locker has been delivered, cause transmission of an indication that the selected locker has been delivered.

7. The system of claim 6, wherein the indication that the selected locker has been delivered includes an indication of products housed within the selected locker.

8. The system of claim 5, wherein the trigger condition is one or more of removal of the selected locker from the retrieval point, delivery of the selected by a delivery vehicle, and the identification of the selected locker.

9. The system of claim 1, wherein at least some of the plurality of lockers include an authentication device.

10. A method for autonomously delivering lockers, the method comprising:
    transporting, via a docking station within a storage area of a carrier vehicle, a plurality of lockers, wherein the storage area includes a retrieval point;
    housing, within each of the plurality of lockers, at least one product;
    identifying, from the plurality of lockers, a selected locker; and
    causing the selected locker to move from the docking station to the retrieval point.

11. The method of claim 10, wherein the delivery vehicle travels via one or more of land, water, and air.

12. The method of claim 10, wherein at least some of the plurality of lockers include a climate control unit, wherein the climate control units are configured to maintain a climate-controlled environment inside each of the at least some of the plurality of lockers.

13. The method of claim 10, wherein the storage area includes a first area and a second area, and wherein the first area is climate controlled.

14. The method of claim 10, further comprising:
    determining, based on a trigger condition, that the selected locker has been delivered.

15. The method of claim 14, further comprising:
    in response to the determining that the selected locker has been delivered, causing transmission of an indication that the selected locker has been delivered.

16. The method of claim 15, wherein the indication that the selected locker has been delivered includes an indication of products housed within the selected locker.

17. The method of claim 14, wherein the trigger condition is one or more of the causing the selected locker to move from the docking station to the retrieval point, delivering the selected locker by a delivery vehicle, and identifying the selected locker.

18. The method of claim 10, wherein at least some of the plurality of lockers include an authentication device.

* * * * *